3,814,601
GRAINLESS PHOTOGRAPHIC MEDIUM AND METHOD OF MAKING SAME
Irwin Schneider, 2402 Daphne Lane,
Alexandria, Va. 22306
Filed July 21, 1972, Ser. No. 273,914
The portion of the term of the patent subsequent to
Mar. 13, 1990, has been disclaimed
Int. Cl. G03c 1/00, 5/04
U.S. Cl. 96—27 E      4 Claims

ABSTRACT OF THE DISCLOSURE

Alkali halide crystals containing anisotropic defects called color centers are used as a photographic medium. The operation of this medium is based on the principle that these anisotropic color centers in the crystal can be aligned and then realigned to produce an image using linearly polarized illumination of a predetermined wavelength.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a novel photographic medium in which the image is established in a photodichroic material by electromagnetic radiation. More particularly, this invention concerns the orientation of anisotropic color centers within an alkali halide crystal to produce an image therein.

Anisotropic color centers behave like atomic-sized dipoles absorbing light of certain wavelength when the light happens to have a component of polarization parallel to their dipole axes. In the crystal, the dipole axis for a particular center lies along one of several possible crystallographic directions depending upon the orientation of the center itself. The reorientation process involves changing the direction of these dipole-like color centers from one or more crystallographic directions to some other predetermined crystallographic direction or directions. For example, the $M_A$ center can randomly appear along one of six possible lattice directions. With polarized light it is possible to align practically all the centers in a crystal along just one of these directions so that plane polarized light is absorbed in the crystal when its polarization vector lies along the color center axis. However, it is not absorbed when its vector is perpendicular to the center's dipole axis. Although the color centers are only of atomic size, it is possible to align a sufficient number such that a visible image can be produced.

DESCRIPTION OF THE PRIOR ART

Known photographic media are generally based on the use of light sensitive emulsions, the most common of which are the silver halides. Briefly, these emulsions are produced by suspending silver halide grains in a gelatin in such a way that each grain is separate from its neighbor. When exposed to light the silver halide grains decompose into their silver and halide components.

Although photographic technology has reached a high stage of development using this type of medium, the medium suffers from certain inherent problems. First, the medium consists of grains of silver halides suspended in a gel. Care must be taken to ensure that the proper size and density of the grains suspended in the gelatin be maintained. Further, image resolution of the photograph is limited by grain size. Secondly, the technique depends upon the irreversible decomposition of silver halide. Thus, the photographic medium is not reusable. Once film is exposed to light it cannot be reused. Thirdly, exposure of a photographic film medium results in an image negative only. The positive is only produced after the developed film has been reexposed to light and the image focussed on a sheet of light sensitive enlarging paper. Fourth, the development of the film and the paper are slow processes requiring wet treatment and drying periods.

SUMMARY OF THE INVENTION

In accordance with the present invention, a novel method for reproducing an image using a novel photographic medium to produce both a positive and negative image is provided. The photographic medium requires no conventional processing procedures and produces a completely grainless image which can be erased and reused.

OBJECTS OF THE INVENTION

It is, therefor, an object of the present invention to provide a novel photographic medium.

It is a further object of the present invention to provide a novel method for producing an image by orienting anisotropic color centers.

It is still a further object of the present invention to provide a grainless photographic medium which can be erased and reused.

It is still a further object of the present invention to provide a photographic medium which contain both a positive and negative and requires no conventional processing procedures.

BRIEF DESCRIPTION OF THE DRAWINGS

Other objects, advantages and novel features of the invention will become apparent from the following detailed description of the invention when considered in conjunction with the accompanying drawings wherein.

DESCRIPTION OF THE PREFERRED EMBODIMENT

In general, the present invention provides a unique photographic medium which can produce both a positive and a negative image. Photographic medium materials suitable for use with the present invention are alkali halides. Alkali halide crystals having dichroic defects, such as anisotropic color centers, are useful because these defects can be selectively aligned along distinct crystal lattice directions. These defects can be aligned selectively to produce a visible image within the crystal.

The dichroic defects suitable for use with alkali halide crystals are known as M and $M_A$ centers. These may exist in concentrations of $5 \times 10^{18}$ per cm.$^3$ of crystal or less. The M and $M_A$ centers with the apparatus in which they are used along with the proper techniques are disclosed in U.S. Pat. No. 3,580,688 and U.S. pat application S.N. 129,709, filed Mar. 31, 1971, now U.S. Pat. No. 3,720,926 which are hereby incorporated by reference.

Figure 2:
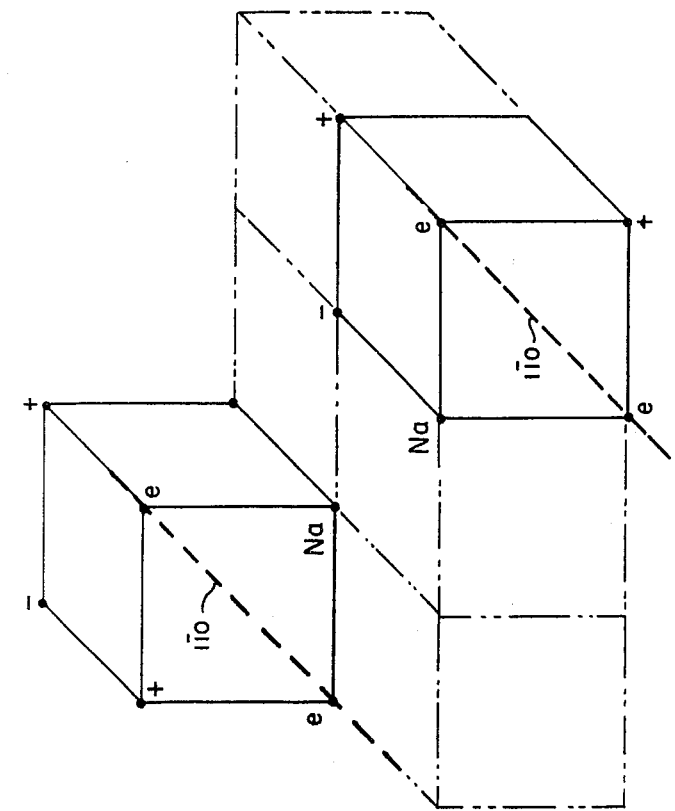
FIG. 2 is a diagrammatic view of a portion of an alkali halide crystal lattice after the $M_A$ centers have been aligned in one common direction.
Figure 1:
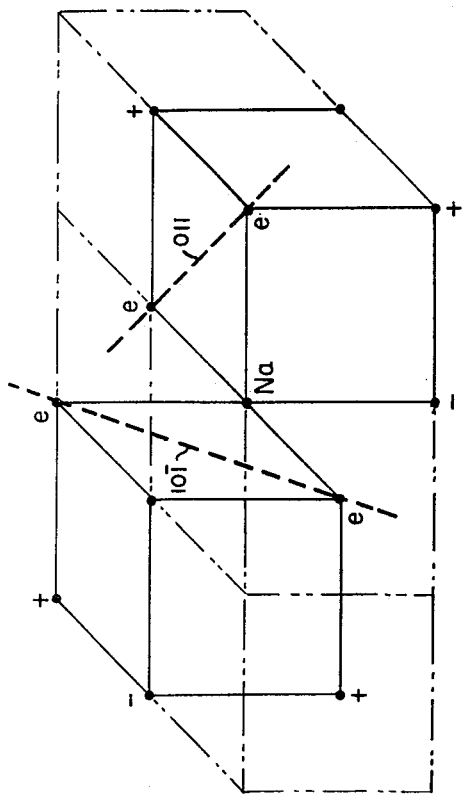
FIG. 1 is a diagrammatic view of a portion of an alkali halide crystal lattice having $M_A$ centers aligned in different directions.

Referring in more detail to FIGS. 1 and 2 there is shown a portion of the simple cubic lattice of an alkali halide crystal. Alkali ions are represented by a plus (+) sign while halide ions are represented by the minus (−) signs.

Controlled sodium impurity is represented by the chemical symbol for sodium (Na) and trapped electrons by the symbol $e$.

While the invention operates with either M or $M_A$ centers, for purposes of illustration only $M_A$ centers are shown. When initially produced the centers form randomly and are equally distributed along the six directions in concentrations of the order $5 \times 10^{18}$ centers per cubic centimeter. For purposes of illustration, FIG. 1 shows one $M_A$ center along the $<10\bar{1}>$ direction and the other $M_A$ center along the $<011>$ direction of the crystal lattice.

The first step required if an alkali halide crystal is to be used as a photographic medium is to align all of the $M_A$ centers along a single lattice direction. To accomplish this, the crystal is exposed to polarized light incident normal to the crystal. After such exposure all of the $M_A$ centers will be aligned in a single lattice direction as illustrated by FIG. 2.

Having aligned the $M_A$ centers in one common lattice direction, the crystal is now ready to be used as a photographic medium.

Figure 3:
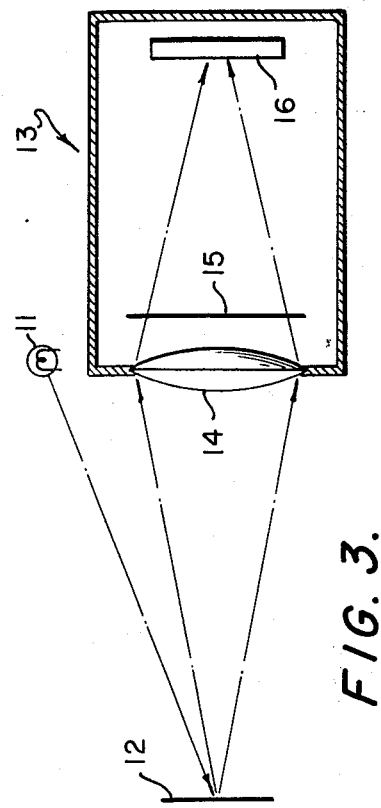
FIG. 3 is a diagrammatic view of one means for reproducing an image on an alkali halide crystal.

Referring to FIG. 3 a crystal 16 having the $M_A$ or M centers aligned along one lattice direction is placed within a camera 13. The object 12 of which the image is to be produced is illuminated with light of a predetermined wavelength from source 11. The light is focussed at lens 14 and polarized at the polarizer 15. It is necessary that this light be polarized at right angles to the polarized light used previously to align the M or $M_A$ centers. The light is focussed at the crystal plane 16 causing the M (or $M_A$) centers to realign.' An image is thus formed on the crystal.

The image on the crystal is viewed by removing the crystal from the camera and illuminating with polarized light of another predetermined wavelength. When illuminated with light of one polarity a negative image is produced. If the polarity of the viewing light is rotated by 90° a positive image is produced.

In order to more fully explain the invention the following illustrations are presented by way of example.

Example 1

Figure 4:
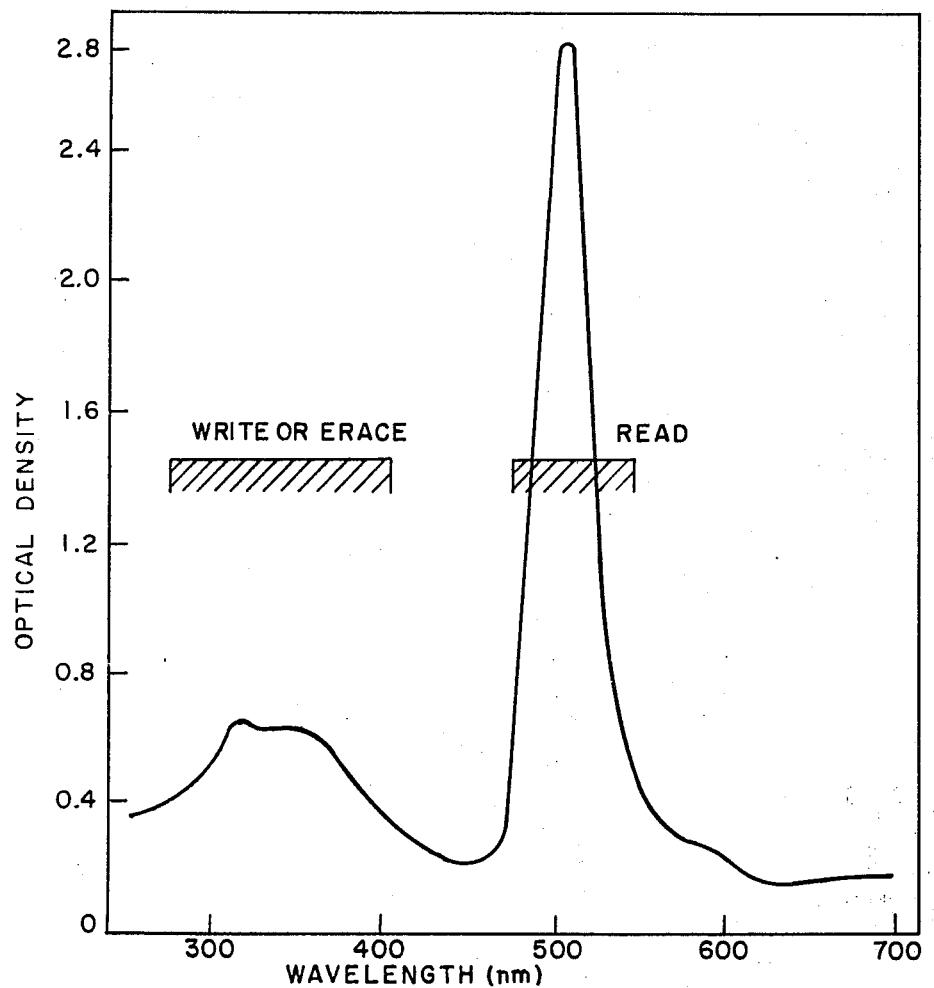
FIGS. 4 and 5 are plots of absorption for sodium fluoride and potassium chloride, respectively.

FIG. 4 is a plot of absorption in a sodium fluoride crystal containing anisotropic color centers. To produce an image on the crystal, the light used to illuminate the object whose image was to be reproduced was found to have a wavelength falling in the "write" section of the spectrum, i.e. 275–400 nm. To view the image produced on the crystal, the wavelength of the light fell in the range from roughly 480–520 nm. To erase the image the NaF crystal was illuminated with light lying in the same wavelength range used to produce the image.

Example 2

Figure 5:
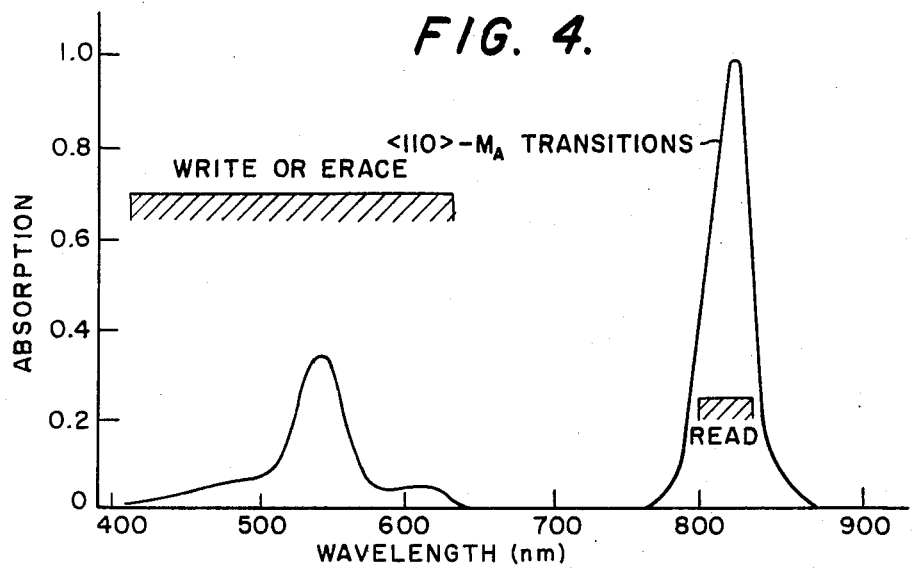

FIG. 5 is a plot of absorption in a potassium chloride crystal containing anisotropic color centers. To produce an image within the crystal, the light used to illuminate the object whose image was to be reproduced was found to have a wavelength falling in the "write" section of the spectrum, i.e. 400–580 nm. To view the image produced in the crystal, the light required had a wavelength of 780–820 nm. The image was erased from the KCl crystal by illuminating said crystal with light having the same wavelength as that used to produce the image.

Any alkali halides which contain anisotropic color centers, such as M or $M_A$ centers, can be used as a photographic medium. Alkali fluorides are especially desirable, however, because the operation can occur at room temperatures when using alkali fluorides. If other alkali halides are used the crystal must be cooled to about 200° K. This can be accomplished by mounting the crystal on a Dewar within the camera.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method for producing an object's image on an alkali fluoride crystal comprising:
   (a) providing an alkali fluoride crystal containing M centers;
   (b) exposing said crystal to a first polarized light incident normal to said crystal whereby said M centers are aligned in a common lattice direction,
   (c) illuminating an object whose image is to be reproduced with a second light having a predetermined wavelength;
   (d) focussing and polarizing said second light at right angles to the polarization of said first light;
   (e) projecting said second light onto said crystal to realign said M centers and produce a visual image thereon.

2. A method according to claim 1 wherein said alkali fluoride crystal consists essentially of sodium fluoride and the wavelength of said second light lies between about 275 nm. to 400 nm.

3. A method for producing an object's image on an alkali fluoride crystal comprising:
   (a) providing an alkali fluoride crystal containing $M_A$ centers;
   (b) exposing said crystal to a first polarized light incident normal to said crystal whereby said $M_A$ centers are aligned in a common lattice direction;
   (c) illuminating an object whose image is to be reproduced with a second light having a predetermined wavelength;
   (d) focussing and polarizing said second light at right angles to the polarization of said first light;
   (e) projecting said second light onto said crystal to realign said $M_A$ centers and produce a visual image thereon.

4. A method according to claim 3 wherein said alkali fluoride crystal consists essentially of sodium fluoride and the wavelength of said second light lies between about 275 nm. to 400 nm.

References Cited

UNITED STATES PATENTS

| | | | |
|---|---|---|---|
| 2,953,454 | 9/1960 | Berman | 96—27 E |
| 3,021,286 | 2/1962 | Etzel et al. | 96—119 PO |
| 3,512,969 | 5/1970 | Robillard | 96—27 R |

RONALD H. SMITH, Primary Examiner

R. L. SCHILLING, Assistant Examiner

U.S. Cl. X.R.

96—88; 340—173 CC